United States Patent
Vandenbroucke

(10) Patent No.: US 6,625,083 B2
(45) Date of Patent: Sep. 23, 2003

(54) METHOD AND DEVICE INTENDED FOR SEISMIC EXPLORATION OF AN UNDERWATER SUBSURFACE ZONE USING SEISMIC RECEIVERS COUPLED WITH THE WATER BOTTOM

(75) Inventor: Eric Vandenbroucke, Nanterre (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/014,403

(22) Filed: Dec. 14, 2001

(65) Prior Publication Data

US 2002/0110048 A1 Aug. 15, 2002

(30) Foreign Application Priority Data

Dec. 15, 2000 (FR) .............................. 00 16536

(51) Int. Cl.$^7$ .............................. G01V 1/38; H04B 1/59
(52) U.S. Cl. .............................. 367/15; 367/16; 181/112
(58) Field of Search .............................. 367/6, 15, 16; 181/110, 112

(56) References Cited

U.S. PATENT DOCUMENTS

| | | | | |
|---|---|---|---|---|
| 3,293,676 A | * | 12/1966 | Link ........................ | 181/110 |
| 3,722,014 A | * | 3/1973 | Hill et al. .................. | 181/112 |
| 4,247,923 A | | 1/1981 | De Kok | |
| 4,463,451 A | * | 7/1984 | Warmack et al. ............ | 367/16 |
| 4,516,227 A | * | 5/1985 | Wener et al. ................ | 367/15 |
| 4,692,906 A | | 9/1987 | Neeley | |
| 5,113,377 A | * | 5/1992 | Johnson ...................... | 367/20 |
| 5,142,499 A | | 8/1992 | Fletcher | |
| 5,189,642 A | * | 2/1993 | Donoho et al. .............. | 367/15 |
| 5,253,223 A | | 10/1993 | Svenning et al. | |
| 5,452,262 A | | 9/1995 | Hagerty | |

FOREIGN PATENT DOCUMENTS

FR    2 772 931    6/1999

OTHER PUBLICATIONS

L. Bibee, "Seismic Penetrator Technology for Use in Shallow Water Seismoacoustics", *1993 IEEE*, pp. I–450–I–454.

M. Briscoe et al., "Motivations and Methods for Ocean Data Telemetry", *JTS Journal*, vol. 21, No. 2, pp. 42–57, Jun. 1987.

J. Deverechere et al., Depoiement d–um reseau de sismographes sous–marins et terrestres en domaine Ligure (Mediterranee): campagne DISBALIG 1 ("Deployment of a Network of Underwater and Land Seismographs in Liquria (Mediterranean): Series SISBALIG 1"), *Mechanics, Physics, Chemistry, Earth Sciences, Universe Sciences*, vol. 313, No. 9, pp. 1023–1030, Oct. 24, 1991).

* cited by examiner

*Primary Examiner*—Nelson Moskowitz
(74) *Attorney, Agent, or Firm*—Antonelli, Terry, Stout & Kraus, LLP

(57) ABSTRACT

A method and device for seismic exploration of an underwater subsurface zone using seismic receivers coupled with the bottom of the water mass. Acquisition units (1) comprising a spire (2) where seismic receivers (4) are arranged, a measuring compartment (5) for acquisition and storage of the data received by the receivers, as well as removable and selective floating devices (7) are used. The acquisition units (1) are launched and, under the effect of gravity, they attach to the bottom and couple the receivers with the underlying formations. The respective positions thereof are first detected, seismic acquisition operations are carried out using an underwater source so as to collect seismic data on the formation, then the floating devices (7) are actuated so as to bring all or part of acquisition units (1) back up to the surface or a data collection device (vehicle or passive collection unit) is lowered to the neighbourhood of the various units.

14 Claims, 4 Drawing Sheets

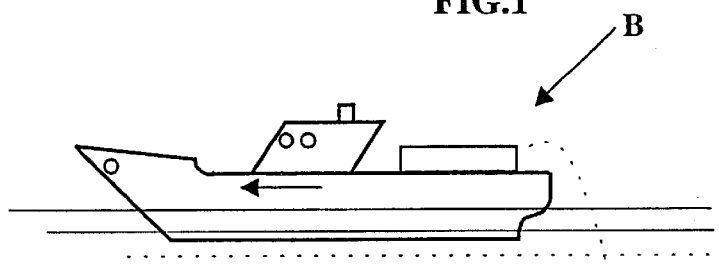
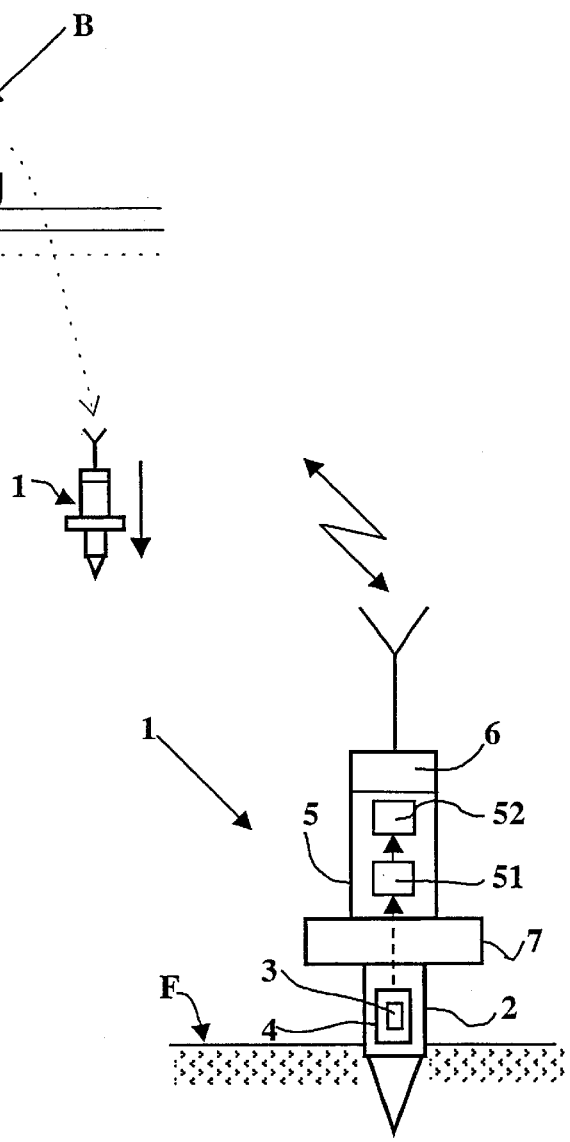
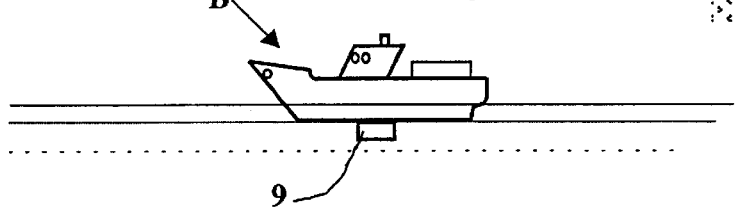
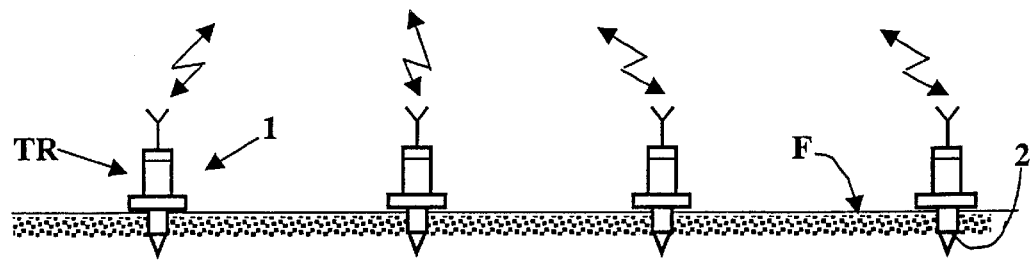

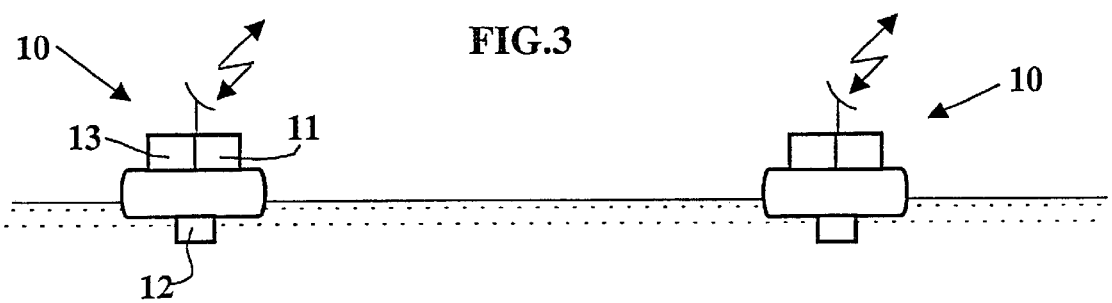
FIG.3
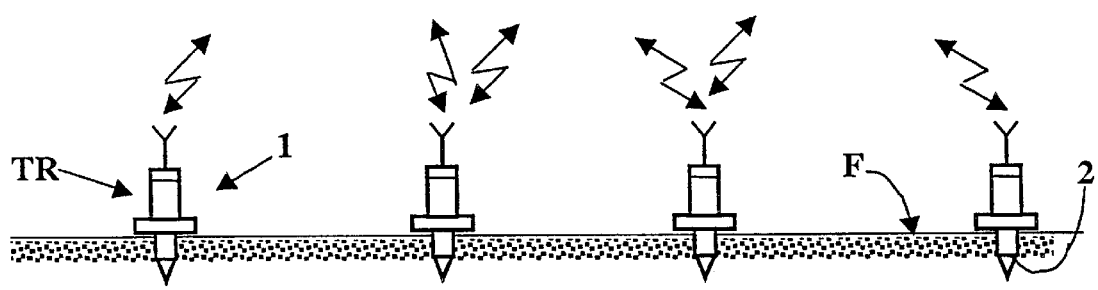
FIG.4
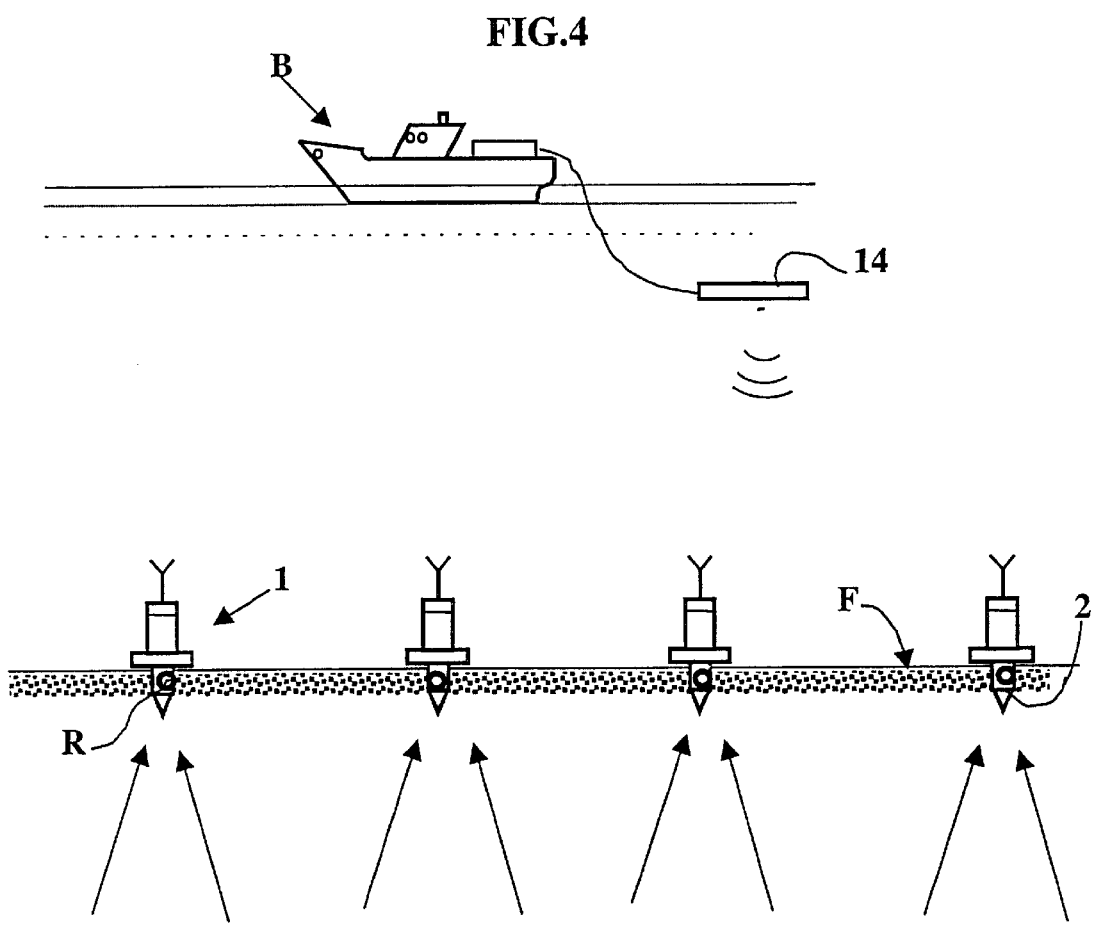

METHOD AND DEVICE INTENDED FOR SEISMIC EXPLORATION OF AN UNDERWATER SUBSURFACE ZONE USING SEISMIC RECEIVERS COUPLED WITH THE WATER BOTTOM

BACKGROUND OF THE INVENTION

1. Field of the Invention

The present invention relates to a method and to a device intended for seismic prospecting or monitoring of an underwater subsurface zone using seismic receivers coupled with the bottom of the water body.

2. Description of the Prior Art

It is well-known to carry out seismic exploration or monitoring operations in a subsea zone, which comprise transmission of seismic waves in the subsurface formation, reception and recording of the waves reflected by the formation discontinuities by means of seismic receivers coupled with the surface of the bottom, and processing the data acquired so as to form seismic images.

U.S. Pat. No. 4,870,625 and WO-9,923,510 describe seismic prospecting methods using a seismic cable or streamer, a first end of which is connected at the surface to a boat or a buoy, long enough for a part at the opposite end to rest on the sea bed. Seismic receivers such as geophones or hydrophones are associated with this part and coupled with the sea bed. The receivers are connected by lines inside the streamer to a surface acquisition equipment.

It is well-known from U.S. Pat. No. 4,692,906 and 5,189,642 to lower to the sea bed seismic units comprising seismic receivers coupled to the sea bed, an electronic equipment for acquisition and recording of the seismic signals picked up in response to the actuation of a seismic source towed underwater, and means for bringing the seismic units back up to the surface at the end of the exploration sessions.

French Patent 2,774,775, filed by the assignee, describes a method for seismic prospecting or monitoring of a subsea reservoir, wherein one or more seismic emission units comprising one or more seismic sources associated with a power supply are lowered onto the sea bottom, each unit being connected to the surface by a multifunction umbilical. Seismic receivers can also be coupled with the bottom surface.

SUMMARY OF THE INVENTION

The device according to the invention allows seismic exploration of a subsurface zone immersed in a water body. The device comprises at least one seismic signal acquisition unit comprising a streamlined part or spire provided with a housing for at least one seismic receiver and a data collection module for data corresponding to seismic signals received by the receivers, each acquisition unit moving downwards under the effect of gravity to the bottom of the water body and to attach thereto so as to couple the seismic receivers with the subsurface formation, the device also comprising a positioning device for each acquisition unit at the bottom and a surface recovery for the seismic data collected by each acquisition unit.

The positioning devices comprise for example an acoustic transponder associated with each acquisition unit and an acoustic ranging set associated with a surface installation for detecting the relative position of each acquisition unit, whether a short-baseline acoustic positioning device associated with a vehicle equipped with satellite positioning or several acoustic transponders associated with one or more surface buoys provided with satellite positioning.

According to an embodiment, each acquisition unit comprises a first transmission set for transmission of the seismic data acquired, and the surface recovery for recovery of the acquired seismic data comprise a vehicle equipped with a second transmission set suited to communicate with the first transmission set.

According to another embodiment, each acquisition unit comprises a first transmission set for transmission of the acquired seismic data, the surface recovery of the acquired seismic data comprising a data collection device provided with a second transmission set suited to communicate with the first transmission set, this device being connected by a cable to a surface installation and brought underwater at a certain distance from each acquisition unit, long enough for transmission of the data.

According to another embodiment, the seismic data recovery comprise removable floats associated with each acquisition unit, suited, on command from a surface installation, to bring back up to the surface at least part of each acquisition unit, such as the collection module.

According to another embodiment, each acquisition unit comprises storage elements for the acquired seismic data, and the removable floats are associated with the storage elements and suited, on command from a surface installation, to bring them back to the surface.

According to another embodiment, each acquisition unit comprises a barrel containing several memory cartridges for the seismic data acquired, and the removable floats are associated with at least one memory cartridge and suited, on command from a surface installation, to bring the memory cartridge back to the surface.

The method according to the invention comprises:
installing the device as defined above;
carrying out seismic exploration operations with emission of waves by an underwater seismic source, reception by the receivers of each acquisition unit of the waves reflected by discontinuities of the subsurface formation in response to the waves emitted in the formation, collection of the data corresponding to the waves received by the receivers, and recovery at the surface of the seismic data acquired by each acquisition unit.

The method comprises for example:
installing at the bottom of the water body at least one seismic signal acquisition unit comprising a streamlined part or spire provided with a housing for at least one seismic receiver and a data collection module for data corresponding to seismic signals received by the receivers, each unit being suited to move downwards under the effect of gravity to the bottom of the water body and adhere to the bottom so as to couple the seismic receivers with the subsurface formation;
determining the position of each acquisition unit installed at the bottom;
carrying out seismic operations with emission of waves by an underwater seismic source, reception of the waves reflected by discontinuities of the subsurface formation in response to the waves emitted in the formation, collection of the data received by the receivers of each acquisition unit; and
recovering at the surface the seismic data acquired by each acquisition unit.

Recovery, at the surface, of the seismic data acquired by each acquisition unit comprises either transfer to the surface of at least part of each acquisition unit, or transmission of the data to a surface installation by means of a vehicle or of a passive device brought near to the acquisition units.

The method and the device can be applied for example for marine seismic prospecting, repetitive marine seismic prospecting in a subsurface formation under development, etc.

BRIEF DESCRIPTION OF THE DRAWINGS

Other features and advantages of the method and of the device according to the invention will be clear from reading the description hereafter of a non-limitative example, with reference to the accompanying drawings wherein:

FIG. 1 diagrammatically shows the layout of a bottom acquisition unit and laying thereof on the water bottom by gravity, FIG. 2 diagrammatically shows a first acoustic locating mode using a short-baseline acoustic positioning device carried by a boat, intended for location of the acquisition units dropped after being coupled with the water bottom, FIG. 3 diagrammatically shows a second acoustic locating mode using GPS positioning acoustic buoys, FIG. 4 diagrammatically shows a first mode of seismic exploration of the underwater zone, FIG. 5 diagrammatically shows the use of inflatable buoys for recovery, at the surface, of the various acquisition units or of their electronic modules only, FIG. 6 diagrammatically shows the use of inflatable buoys for recovery, at the surface, of the dropped elements intended for storage of the seismic data acquired, from the bottom acquisition units, FIG. 7 diagrammatically shows the use of a subsea robot brought successively close to the various acquisition units in order to collect the seismic data accumulated therein, and FIG. 8 diagrammatically shows the use of an intermediate data collection device lowered near to the bottom and communicating by modulated waves with the various acquisition units in order to collect the seismic data accumulated therein.

DETAILED DESCRIPTION

Figure 5:
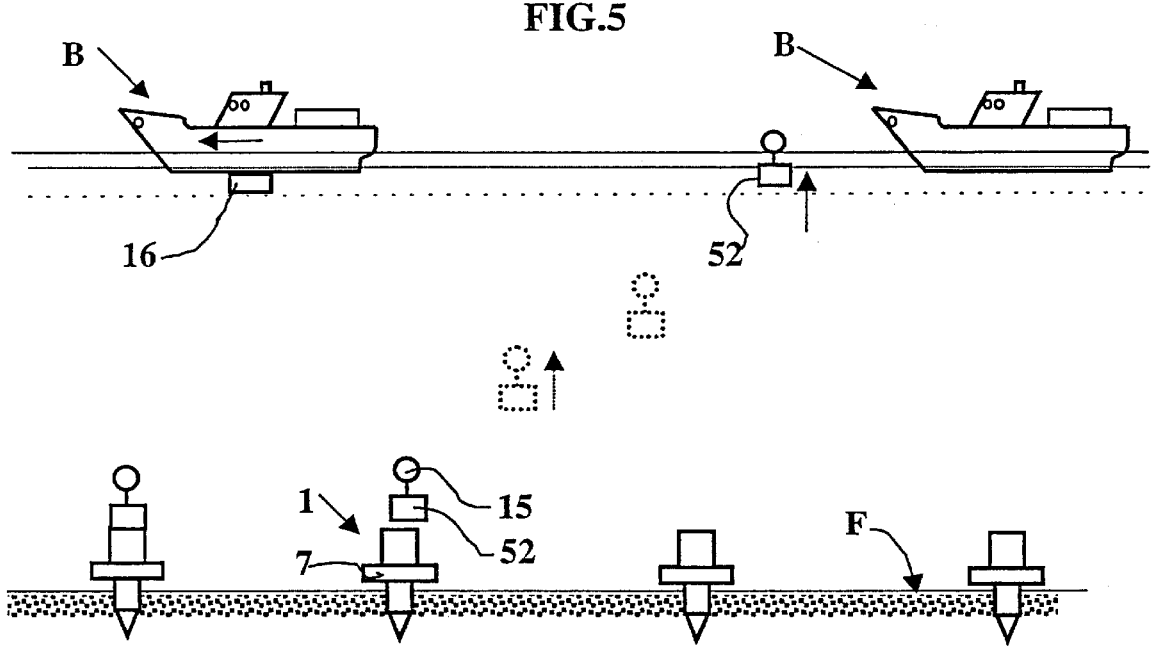

The seismic wave reception system according to the invention comprises (FIG. 1) a series of acquisition units 1 suited to be coupled with the bottom of a water body. Each acquisition unit 1 comprises a streamlined body or spire 2 provided with a housing 3 for one or more seismic receivers 4 of any type: geophone (s) of three-dimensional type for example (triphone(s), hydrophone(s), or others), a data collection module 5 containing an electronic acquisition module 51 and a storage module 52 for storage of the seismic data received by the receivers in body 2, a modulated wave emission-reception device 6, and removable float 7 for bringing back to the surface and recover of all or part of acquisition unit 1. Removable float 7, which is not shown in detail in FIG. 1, conventionally comprise one or more inflatable buoys, compressed air cylinders, and one or more removable connecting elements which release on command the part of the bottom equipment to be recovered.

The structure of each electronic module 5 conventionally comprises several amplification, digitizing and filtering chains, and a multiplexor for connecting the various chains to a storage block. Such a structure is for example described in French Patent 2,692,384.

Body 2 is sufficiently heavy or weighted to move downwards onto the bottom of the water body and adhere to the bottom when the acquisition unit is launched from a surface boat 8 (FIG. 1), and thus to mechanically couple the seismic receivers with the underlying formations.

Emission-reception device 6 comprises for example (FIGS. 2, 3) an acoustic transponder TR allowing location of the position of each acquisition unit 1 after anchoring to the bottom. Locating can be carried out (FIG. 2) by a surface boat provided with an acoustic positioning device 9 with a relatively short baseline of USBL (Ultra Short Base Line) type for example. Locating the bottom acquisition units can also be performed by means of a long acoustic baseline consisting of several floating buoys 10 provided each with a positioning device 11 of GPS type, an acoustic transponder 12, and a radio module 13 for communication with a central station on a boat that is not shown. The position of the various acquisition units 1 at the bottom of the water is calculated by combining the GPS position data and the data resulting from the acoustic ranging measurements between acoustic transponders 12 on buoys 10 and bottom transponders TR.

With a series of acquisition units 1 distributed in a line or preferably several substantially parallel lines, seismic exploration operations can be carried out. A seismic source 14 of a well-known type (air gun, water gun, etc.) towed underwater by a boat B (FIG. 4) emits seismic waves. The waves reflected by the discontinuities of the sea bed in response to the acoustic waves emitted by source 14 are received by receivers R, and acquired and stored by the various acquisition units 1.

Several stored data recovery modes can be used. It is possible to either bring back to the surface all or part of the recording media storing the data from the various acquisition units 1, or to lower, close to the various acquisition units 1, a storage to which the recording media can transfer the data by emission of modulated acoustic waves for example.

Media Recovery

According to the implementation mode of FIG. 5, the floats comprise an inflatable buoy 15 associated with the storage module 52 (FIG. 1) of each acquisition unit 1. Upon reception, by transponder TR, of a control signal from a surface acoustic transmitter 16, buoy 15 is inflated and disconnected from the acquisition unit. Storage module 52 thus comes back up to the surface where it is recovered. This mode is well-suited for 3D seismic exploration operations.

Figure 6:
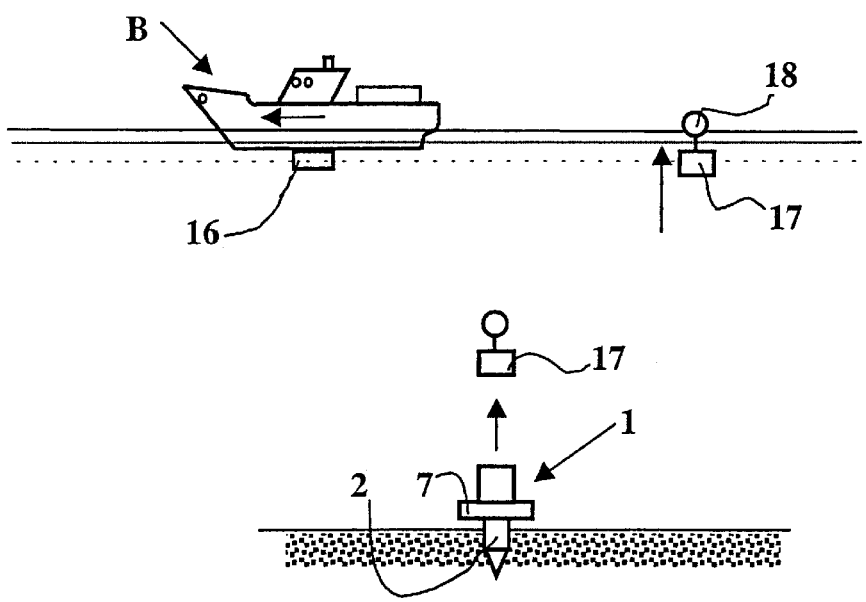

According to the implementation mode of FIG. 6, recovery of the data can be split up. Storage module 52 comprises a barrel (not shown) for several memory cartridges 17 which are successively filled with the acquired seismic data. Each one is associated with a buoy 18. When a cartridge is filled with data, dropping of the corresponding buoy and connection of another cartridge of the barrel to the acquisition module are controlled from the surface central station. The released cartridge is recovered at the surface. This implementation mode is well-suited to 4D type repetitive seismic monitoring or exploration operations wherein successive seismic images of the same zone are formed at predetermined time intervals so as to detect by comparison the changes of state that have occurred. During each session, the corresponding seismic data is fed into a memory cartridge 17 which is taken back up to the surface alone.

Seismic Data Recovery by Transmission

Figure 7:
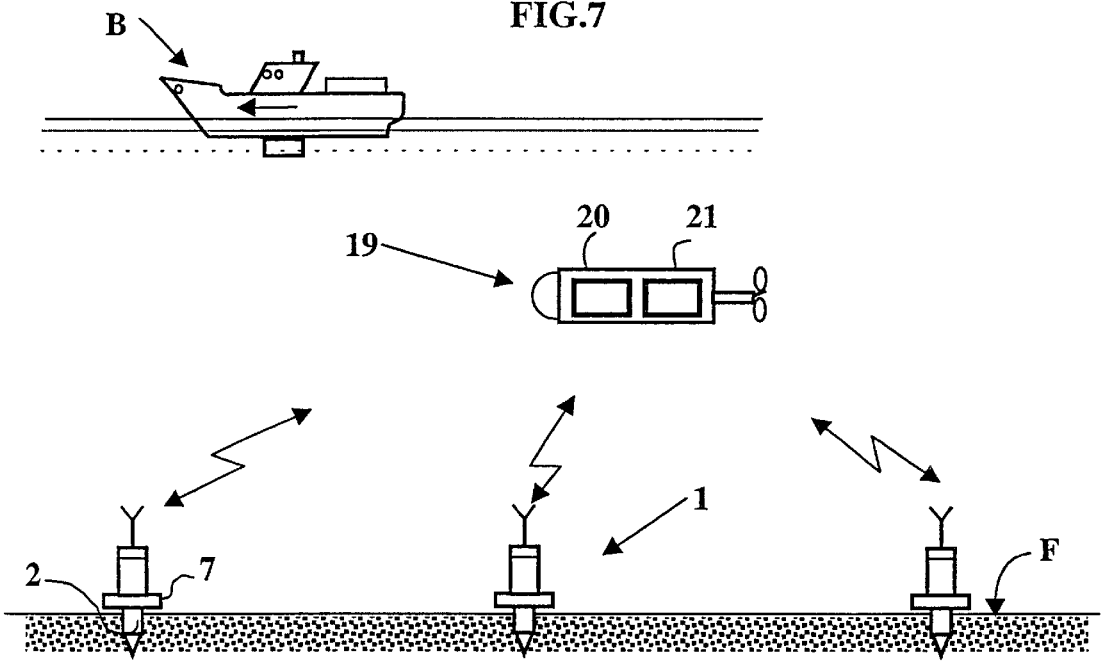

According to the implementation mode of FIG. 7, recovery of the data contained in the memories of the various acquisition units 1 is carried out by means of an underwater vehicle 19 of AUV or ROV type for example, which is lowered close to acquisition units 1. The vehicle is provided with a mass memory 20. It communicates with each acquisition unit through an acoustic or optical modulated wave emission-reception device 21. On command, the acquisition units successively transfer thereto the content of their storage modules.

Figure 8:
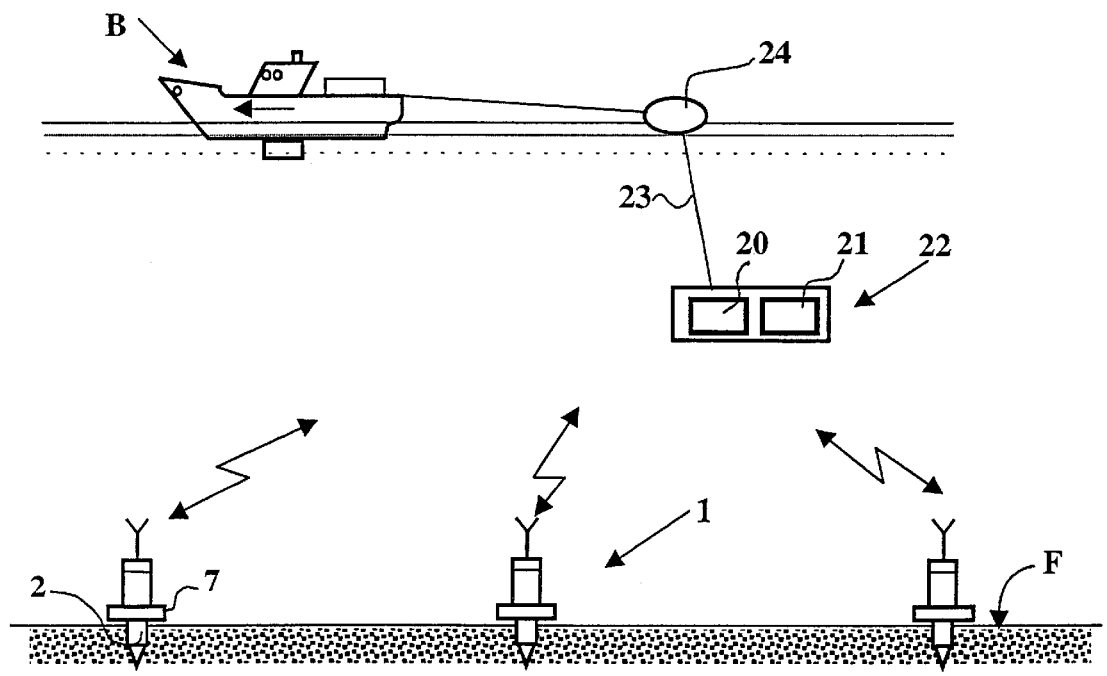

According to the alternative implementation mode of FIG. 8, mass memory 20 and modulated wave emission-reception device 21 are placed in a container 22 lowered close to the bottom, and connected by a cable 23 to a surface buoy 24. Buoy 24 is connected to a towboat B.

What is claimed is:

1. A system for seismic exploration of an underwater subsurface formation comprising:
   a displaceable collecting assembly which moves under water and is deployed under water to collect seismic data and includes a recording unit;
   at least one seismic signal acquisition unit for operation on a bottom of a water body comprising at least seismic receiver including a data acquisition module for collecting seismic signals sensed by the at least one seismic receiver which couples the at least one seismic receiver to the formation;
   an acoustic ranging assembly which communicates with the at least one seismic signal acquisition unit and provides a reference for obtaining a position of the at least one seismic signal acquisition unit when operating on the bottom of the water body; and
   a data transmission link which transmits seismic data collected by the at least one acquisition unit to the recording unit while the displaceable collecting unit is under water to collect seismic data.

2. A system for seismic exploration of an underwater subsurface formation comprising:
   a displaceable collecting assembly which moves under water and is deployed under water to collect data and includes a recording unit;
   at least one seismic signal acquisition unit including a spire associated with housing containing at least one seismic receiver which collects seismic signals sensed by the at least one seismic receiver, the spire leading the acquisition unit downwards solely under an effect of gravity to the bottom of the water body and driving the spire therein to couple the at least one acquisition unit with the subsurface formation;
   an acoustic transponder associated with the at least one acquisition unit;
   an acoustic ranging assembly which communicates with the at least one seismic signal acquisition unit and provides a reference for obtaining a position of each acquisition unit on the bottom of the water body; and
   a data link which transmits seismic data between the at least one acquisition unit and the recording unit which records the data when the displaceable collecting assembly is deployed under water to collect data.

3. A system as claimed in claim 1, wherein:
   the acoustic ranging assembly includes an acoustic baseline with surface buoys provided with acoustic transponders and satellite positioning units to provide positions of the buoys.

4. A system as claimed in claim 2, wherein:
   the acoustic ranging assembly includes an acoustic baseline with surface buoys provided with acoustic transponders and satellite positioning units to provide positions of the buoys.

5. A system as claimed in claim 1, wherein:
   the acoustic ranging assembly includes an acoustic transponder associated with the at least one surface buoy provided with a satellite positioning unit to provide a position of the buoy for forming an acoustic baseline.

6. A system as claimed in claim 2, wherein:
   the acoustic ranging assembly includes an acoustic transponder associated with the at least one surface buoy provided with a satellite positioning unit to provide a position of the vehicle for forming an acoustic baseline.

7. A system as claimed in claim 1, wherein:
   the data transmission link includes a first transmission set in the at least one acquisition unit for transmission of the collected seismic data and the displaceable collecting assembly includes a vehicle provided with a second transmission set for communicating with the first transmission set.

8. A system as claimed in claim 2, wherein:
   the data transmission link includes a first transmission set in the at least one acquisition unit for transmission of the collected seismic data and the displaceable collecting assembly includes a vehicle provided with a second transmission set for communicating with the first transmission set.

9. A system as claimed in claim 1, wherein:
   the data link comprises a first transmission set in the at least one acquisition unit for transmission of the collected seismic data and the displaceable collecting assembly includes a body including a data collection device and a second transmission set for communicating with the first transmission set and which is placed underwater at a distance from each acquisition unit during transmission of the seismic data to the displaceable collecting assembly.

10. A system as claimed in claim 1, wherein:
    the data link comprises a first transmission set in the at least one acquisition unit for transmission of the collected seismic data and the displaceable collecting assembly includes a body including a data collection device and a second transmission set for communicating with the first transmission set during which is placed underwater a distance from each acquisition unit during transmission of the seismic data to the displaceable collecting assembly.

11. A system as claimed in claim 7, wherein:
    the first transmission set and the second transmission set includes one of acoustic or optical transmission modules.

12. A system as claimed in claim 9, wherein:
    the first transmission set and the second transmission set includes one of acoustic or optical transmission modules.

13. A method of seismic exploration of an underwater subsurface formation, comprising:
    installing at a bottom of a water body at least one seismic signal acquisition unit including at least one seismic receiver including a data acquisition module for collecting seismic signals sensed by the at least one seismic receiver and an acoustic transponder coupling the at least one seismic receiver to the formation;
    determining a position of each acquisition unit installed at the bottom of the water body with respect to an acoustic ranging assembly which communicates with the at least one seismic signal acquisition unit and provides a reference for obtaining a position of the at least one seismic acquisition unit which is obtained with a satellite positioning system;

carrying out seismic operations with transmission of seismic waves by an underwater seismic source to the subsurface formation and receiving waves with the at least one receiver reflected by discontinuities of the subsurface formation in response to the transmission of seismic waves to the subsurface formation and collecting seismic data with the data acquisition module of the at least one acquisition unit; and recovering at the surface of the water body the seismic data collected by the at least one acquisition unit using a recording unit associated with a displaceable collecting assembly which moves under the water and is deployed under the water to collect seismic data while an acoustic or optical transmission link transmits seismic data collected by the at least one acquisition unit to the recording unit which records the seismic data.

14. A method as claimed in claim 13, comprising:

driving with a spire, associated with each of the at least one acquisition unit, each of the at least one acquisition unit under a sole effect of gravity into the bottom of the water body to couple the at least one seismic receiver with the subsurface formation.

* * * * *